United States Patent Office 3,169,935
Patented Feb. 16, 1965

3,169,935
CHLORINATED POLYVINYL CHLORIDE PLASTIC COMPOSITIONS CONTAINING CHLORINATED PARAFFINIC HYDROCARBON PLASTICIZERS
Francis Raymond Sherliker and Percy Jefferson Whinyates, Widnes, England, assignors to Imperial Chemical Industries Limited, London, England, a corporation of Great Britain
No Drawing. Filed June 18, 1962, Ser. No. 203,008
Claims priority, application Great Britain, June 26, 1961, 22,995/61
10 Claims. (Cl. 260—28.5)

The present invention relates to plastic compositions. More particularly it relates to plastic polymer compositions in which the plastic polymer material is after-chlorinated polyvinyl chloride with or without an admixture of polyvinyl chloride.

It is known to employ polyvinyl chloride mixed with plasticizers, stabilizers, pigments and optionally a proportion of filler to yield compositions varying from very flexible to hard with good resistance to wear. Such compositions are particularly well known in the form of floor tiles and other forms of floor covering, flexible sheets, and extrusions such as tubing. It has long been known that polyvinyl chloride may be after-chlorinated to a total chlorine content greater than 60% and that the film-forming properties of the polymer are thereby somewhat modified. The after-chlorinated material has been used in the production of thin films and fibres but has not hitherto found much use in massive form.

We have now found considerable advantages in certain novel compositions containing after-chlorinated polyvinyl chloride as the whole or part of the plastic ploymer material.

In compounding polyvinyl chloride and similar known plastic compositions it has been necessary to include a so-called primary plasticizer, usually an organic ester such as dioctyl phthalate or tritolyl phosphate, in the composition. The amount of primary plasticizer is usually as high as 60 parts per 100 parts by weight of the polymer. Although in later years it has been found possible to replace a part of the expensive primary plasticizer by a cheaper plasticizer extender such as a chlorinated paraffin wax, nevertheless the amount of extender is limited by its compatibility with the polymer and the primary plasticizer. If the compatibility limit is exceeded, sweating occurs, i.e. an exudate appears on the surface of the molded material on ageing. For example it is generally found that the ratio of a primary plasticizer such as dioctyl phthalate to a typical extender such as a chlorinated paraffin wax containing 42% by weight of chlorine should not be less than 2:1. Thus the large amount of primary plasticizer needed may account for a significant proportion of the total cost of the composition.

We have found surprisingly that chlorinated polyvinyl chloride containing 60–70% chlorine (preferably about 62–65%) can be satisfactorily compounded with so-called plasticizer extenders of the chlorinated hydrocarbon type without the addition of any conventional primary plasticizer, to yield very useful plastic compositions. We have in fact found that the chlorinated hydrocarbons previously considered to be useful in plastic compositions only as plasticizer extenders can be employed as true primary plasticizers, and indeed if desired can be employed as the sole plasticizing agents, in plastic compositions based on chlorinated polyvinyl chloride of 60–70% chlorine content. For the avoidance of confusion with the conventional primary plasticizers, however, the said chlorinated hydrocarbons are hereinafter referred to as chlorinated hydrocarbon plasticizers.

We have found that the ratio of chlorinated hydrocarbon plasticizer:polymer may be surprisingly high without showing any signs of incompatibility, for example even a preponderance by weight of the plasticizer may be compounded with chlorinated polyvinyl chloride without causing any exudation from the product on ageing. We have furthermore found that mixtures of polymer and chlorinated hydrocarbon plasticizer may be mixed with very high proportions of solid filler to yield compositions which are particularly suitable for flooring materials. The chlorinated hydrocarbon plasticizers are relatively cheap and they confer other advantages on the compositions of the invention. They are non-inflammable, non-toxic and resistant to many chemicals, including detergents. Because of the large amount of chlorinated hydrocarbon plasticizer and filler which can be employed, the compositions of the present invention have a lower raw materials cost than many conventional filled plastic compositions.

We have also found that the aforesaid plastic compositions containing only chlorinated polyvinyl chloride as plastic polymer material can be further improved by incorporating therein a proportion of unchlorinated polyvinyl chloride. We have found surprisingly that this can be done without causing exudation of the chlorinated hydrocarbon plasticizer from the composition on ageing. This addition of unchlorinated polyvinyl chloride gives an even lower raw materials cost for the resultant plastic compositions and it gives an added advantage for certain uses, e.g. floor coverings, in that the compositions obtained are somewhat harder than those in which all the plastic polymer is chlorinated polyvinyl chloride when compared at the same ratio of total plastic polymer material to plasticizer. A high proportion of filler may also be incorporated in the modified compositions, and the resultant filled compositions are particularly suitable for floor tiles and other forms of floor covering and for extrusions such as pipes.

According to the present invention, there is provided a plastic composition comprising chlorinated polyvinyl chloride containing 60–70% (preferably 62–65%) by weight of chlorine and a plasticizing proportion of a chlorinated hydrocarbon plasticizer as hereinafter defined as primary plasticizer.

The invention also includes within its scope a plastic composition as defined in the preceding paragraph and comprising additionally polyvinyl chloride.

There is furthermore provided within the scope of the invention a filled plastic composition which comprises a plastic composition as defined in either of the preceding paragraphs together with a solid filling material.

As stated hereinbefore, the chlorinated hydrocarbon plasticizers may be employed as the sole plasticizing agents in compositions according to the invention, and in general we prefer to employ them in this way so as to obtain the maximum benefit from the excellent chemical properties and low cost of these plasticizers. Nevertheless we do not exclude the addition of a proportion of conventional primary plasticizers such as esters to the plastic compositions when for example minimum cost and maximum chemical inertness are not of major consideration. The invention thus includes within its scope plastic compositions comprising chlorinated polyvinyl chloride with a major amount of chlorinated hydrocarbon plasticizer and a minor amount of a conventional primary plasticizer such as an ester and optionally a proportion of unchlorinated polyvinyl chloride.

By the term "chlorinated hydrocarbon plasticizer" we mean one or more of those chlorinated hydrocarbons commonly used as plasticizer extenders in plastic compositions. Of this class of materials the paraffinic hydrocarbons, both natural and synthetic, containing 12 to 26 carbon atoms per molecule, chlorinated to 40–70% by weight chlorine content, are particularly suitable. In the interests of stability we prefer that they should contain as small a proportion of branched chain units as possible. One such material which is preferred because of ease of compounding with the other ingredients of the plastic compositions of the invention is a $C_{14}$ paraffinic hydrocarbon chlorinated to 50% by weight chlorine content.

The chlorinated hydrocarbon plasticizers may be compounded with chlorinated polyvinyl chloride in any proportions, depending on the properties required in the product. The higher the proportion of plasticizer, however, the softer is the plastic composition produced, and for most purposes we prefer to employ not more than 100 parts of chlorinated hydrocarbon plasticizer, and usually 40–100 parts, per 100 parts by weight of chlorinated polyvinyl chloride.

When polyvinyl chloride is incorporated in the plastic composition we prefer to limit its proportion for most applications to a maximum of 300 parts per 100 parts by weight of chlorinated polyvinyl chloride in the composition. For proportions of polyvinyl chloride up to 200 parts per 100 parts by weight of chlorinated polyvinyl chloride we prefer to employ 80–100 parts of chlorinated hydrocarbon plasticizer per 100 parts of chlorinated polyvinyl chloride and polyvinyl chloride together. When the proportion of polyvinyl chloride is in the range 200–300 parts per 100 parts by weight of chlorinated polyvinyl chloride we prefer to employ a maximum of 80 parts of chlorinated hydrocarbon plasticizer per 100 parts of chlorinated polyvinyl chloride and polyvinyl chloride together.

For some applications, e.g. for thin sheet articles and for surface layers on laminated flooring materials, the plastic compositions of the invention may be used in the unfilled state. For most applications, however, it will be desirable to incorporate a solid filler into the plastic composition. When filled compositions are required the amount and type of filler may be varied to give a wide range of properties in the products. For example 300 parts by weight of inert filler per 100 parts of plastic polymer and 100 parts by weight of chlorinated hydrocarbon plasticizer provide a very flexible product, whereas 700–800 parts of filler give a very hard product. Whiting and/or asbestos are very suitable inert fillers. A composition containing equal weights of plastic polymer and chlorinated hydrocarbon plasticizer with 3–4 times their combined weight of filler is particularly suitable for the production of floor tiles. The composition should additionally contain about 5 parts by weight of a heat stabilizer per 100 parts of polymer and a small amount, e.g. 1 part by weight, of a conventional mould lubricant such as calcium stearate per 100 parts of polymer. Pigments may be added as desired. White lead paste is a suitable stabilizer for pigmented compositions.

Smaller proportions of inert solid filler may usefully be employed, for instance 100 parts per 100 parts by weight of plastic polymer, to produce filled composition suitable for extrusion, e.g. for the manufacture of flexible tubing.

Yet again, a filled composition suitable for the manufacture of flexible, chemically resistant sheeting may be obtained by adding a reinforcing filler to the unfilled plastic compositions. Small amounts of a reinforcing filler, e.g. 20 parts per 100 parts by weight of plastic polymer, increase the hardness and the 100% modulus of the compositions at the expense of a slight rise in the cold flex temperature.

The following examples illustrate compositions within the scope of the invention, but the invention is not limited thereby.

Example 1

The following table shows the properties of unfilled plastic compositions comprising chlorinated polyvinyl chloride and various proportions of chlorinated hydrocarbon plasticizer, with and without a proportion of unchlorinated polyvinyl chloride. The polyvinyl chloride used was the grade known as "Corvic" D55/9 ("Corvic" is a registered trademark). The chlorinated polyvinyl chloride was derived from this by chlorination to a chlorine content of approximately 64% by weight and was stabilized by addition of 2 parts per 100 of an organo-tin stabilizer ("Stanclere" 80) and 3 parts per 100 of an epoxidized vegetable oil ("Abrac" A) by weight. ("Stanclere" and "Abrac" are registered trademarks.) The chlorinated hydrocarbon plasticizer was substantially the normal $C_{14}$ paraffin chlorinated to 50% by weight chlorine content. (This was a commercially available material containing only a very small proportion of branched chain units.) By comparing columns 4 and 5 with column 3 of the following table it will be seen that the replacement of chlorinated polyvinyl chloride by unchlorinated material increases the hardness and the 100% modulus of the resultant compositions but has little effect on other physical properties.

| Physical Properties of Unfilled Composition | Parts Chlorinated Hydrocarbon Plasticizer per 100 Parts Total Resin by Wt. | Wt. Percent Unchlorinated PVC in Total Resin | | |
|---|---|---|---|---|
| | | 0 | 25 | 50 |
| Softness Number (B.S. 2571) | 60 | 47 | 39 | 42 |
| | 80 | 110 | 86 | 75 |
| | 100 | 154 | 117 | 99 |
| Cold Flex Temp., °C | 80 | −12 | −11 | −12 |
| | 100 | −18 | −19.5 | −20.5 |
| 100% Modulus, lb./in.² | 80 | 520 | 720 | 810 |
| | 100 | 290 | 420 | 570 |
| Tensile Strength, lb./in.² | 80 | 2,020 | 2,160 | 2,100 |
| | 100 | 1,690 | 1,650 | 1,690 |
| Extension at Break, Percent | 80 | 370 | 370 | 390 |
| | 100 | 420 | 410 | 430 |

Example 2

Columns A–F of the following table illustrate the incorporation of a high proportion of inert filler in plastic compositions based on chlorinated polyvinyl chloride. The chlorinated polyvinyl chloride employed was obtained by chlorinating that grade of polyvinyl chloride known as "Corvic" D65/6 to a total chlorine content of approximately 64% chlorine. ("Corvic" is a registered trademark.) The chlorinated hydrocarbon plasticizer was the $C_{14}$ paraffin chlorinated to 50% by weight chlorine content as used in Example 1.

The ingredients shown in the following table were milled together, molded and tested as shown.

| Composition | A | B | C | D | E | F |
|---|---|---|---|---|---|---|
| Chlorinated polyvinyl chloride, parts by weight | 100 | 100 | 100 | 100 | 100 | 100. |
| Chlorinated hydrocarbon plasticizer, parts by weight | 100 | 100 | 100 | 100 | 100 | 100. |
| Whiting, parts by weight | 300 | 400 | 700 | 800 | | 300. |
| Asbestos powder, parts by weight | | | | | 700 | 300. |
| Calcium stearate, parts by weight | 1 | 1 | 1 | 1 | 1 | 1. |
| 'Vynamon' pigment, parts by weight | 2 | 2 | 2 | 2 | 6 | 4. |
| White lead paste, parts by weight | 5 | 5 | 5 | 5 | 5 | 5. |
| Treatment: Milling | 10 min. at 140–145° C. | 13 min. at 145–150° C. | 40 min. at 145–155° C.; 3 min. at 155–165° C. | 13 min. at 150–160° C. | 20 min. at 150–155° C. | 15 min. at 150–160° C. |
| Molding 5 min. at 2 tons, 2 min. at 15 tons on 8 in. x 8 in. platens. | 160° C | 160° C | 160° C | 160° C | 160–170° C | 160–170° C. |
| Results: Appearance of molded specimen | Tough and rubbery. | Tough and rubbery. | Hard, slightly flexible. | Hard and scarcely flexible. | Very hard and scarcely flexible. | Slightly flexible. |
| Density g./ml | 1.96 | 2.05 | 2.15 | | | |
| Volatility, percent (B.S. 3261: 1960) | 0.3 | 0.3 | 0.3 | 0.2 | 0.2 | |
| Flexibility (B.S. 3261:1960) | Passed | Passed | | | | |

"Vynamon" is a registered trademark.

Example 3

The following table shows the properties of a filled composition suitable for extrusion, e.g. to produce flexible tubing. The chlorinated polyvinyl chloride and the chlorinated hydrocarbon plasticizer were the same as in Example 2. All quantities of ingredients were parts by weight.

Composition:

| | |
|---|---|
| Chlorinated polyvinyl chloride | 100 |
| Chlorinated hydrocarbon plasticizer | 80 |
| Finely divided calcium carbonate coated with a small amount of stearic acid ("Winnofil" S) | 100 |
| Phthalic acid ester ("Loxiol" W100) | 6 |
| Fatty acid ester lubricant ("Loxiol" G10) | 1.5 |
| Barium/cadmium laurate, antioxidant stabilizer ("Ferroclere" 1820) | 1.5 |
| Pigment | 2 |

Properties:

| | |
|---|---|
| Softness number (B.S. 2571) | 56 |
| Cold flex temp., ° C. | −11.5 |
| 100% modulus, lb./in.$^2$ | 1280 |
| Tensile strength, lb./in.$^2$ | 1380 |
| Extension at break, percent | 170 |

"Winnofil," "Loxiol" and "Ferroclere" are registered trademarks.

Example 4

The following table shows the properties of a plastic composition suitable for the manufacture of chemically resistant sheeting, based on equal parts by weight of chlorinated polyvinyl chloride and polyvinyl chloride and lightly filled with a reinforcing filler. The chlorinated polyvinyl chloride and the chlorinated hydrocarbon plasticizer were the same as in Example 2. The polyvinyl chloride was the grade known as "Corvic" D55/9. All quantities of ingredients were parts by weight.

Composition:

| | |
|---|---|
| Chlorinated polyvinyl chloride | 50 |
| Polyvinyl chloride | 50 |
| Chlorinated hydrocarbon plasticizer | 80 |
| Hydrated sodium aluminium silicate reinforcing filler ("Fortafil" A70) | 20 |
| Tribasic lead sulphate | 5 |
| Titanium dioxide | 10 |
| Calcium stearate | 1 |

Properties:

| | |
|---|---|
| Softness number (B.S. 2571) | 36 |
| Cold flex temp., ° C. | −7 |
| 100% modulus, lb./in.$^2$ | 1750 |
| Tensile strength, lb./in.$^2$ | 2400 |
| Extension at break, percent | 190 |

"Fortafil" is a registered trademark.

Example 5

The following table shows three unfilled compositions based on chlorinated polyvinyl chloride and plasticized with two varieties of chlorinated paraffin wax and with a mixture of a chlorinated paraffin wax and a chlorinated liquid hydrocarbon respectively. Chlorinated hydrocarbon plasticizer X was a paraffin wax of mainly $C_{24}$ chain length chlorinated to 42% by weight chlorine content. Chlorinated hydrocarbon plasticizer Y was the same paraffin wax chlorinated to 54% by weight chlorine content. Chlorinated hydrocarbon plasticizer Z was the $C_{14}$ paraffin chlorinated to 50% by weight chlorine content as used in the previous examples.

| Composition | A | B | C |
|---|---|---|---|
| Chlorinated Polyvinyl Chloride (65% Cl$_2$, w./w.) | 100 | | 100 |
| Chlorinated Polyvinyl Chloride (64% Cl$_2$, w./w.) | | 100 | |
| Chlorinated Hydrocarbon Plasticizer X | 50 | | |
| Chlorinated Hydrocarbon Plasticizer Y | | 100 | 50 |
| Chlorinated Hydrocarbon Plasticizer Z | | | 50 |
| Organo-Tin Stabilizer ("Stanclere" 80) | 2 | 2 | 2 |
| Epoxidised Vegetable Oil | 3 | 3 | 3 |
| Properties: | | | |
| Softness Number (B.S. 2571) | 12 | 16 | 62 |
| Cold Flex Temp. ° C | 7 | 15.5 | 0 |
| Tensile Strength, lb./in.$^2$ | 3,245 | 3,380 | 3,410 |
| Extension at Break, percent | 185 | 180 | 230 |

Example 6

Storage trials were carried out on a composition containing a high proportion of unchlorinated polyvinyl chloride as follows: 100 parts by weight of chlorinated polyvinyl chloride containing approximately 65% by weight of chlorine, 300 parts of polyvinyl chloride and 240 parts of chlorinated hydrocarbon plasticizer ($C_{14}$ hydrocarbon chlorinated to 50% by weight chlorine content) were milled together and molded into sheets. The sheets were stored at room temperature and after 30 weeks' storage there was no visible surface change, i.e. no exudation of plasticizer.

What we claim is:

1. A plastic composition which comprises 100 parts by weight of chlorinated polyvinyl chloride containing 60–70 percent by weight of chlorine and as primary plasticizer therefor, 50–100 parts by weight of paraffinic hydrocarbon chlorinated to 40–70 percent by weight of chlorine, selected from the group consisting of chlorinated $C_{14}$ paraffinic hydrocarbon and chlorinated paraffin wax.

2. A plastic composition which comprises 100 parts by weight of a mixture of chlorinated polyvinyl chloride containing 60–70 percent by weight of chlorine with not more than three times its weight of polyvinyl chloride and as primary plasticizer in said mixture 50–100 parts by weight of a member containing 40–70 percent by weight of chlorine selected from the group consisting of chlorinated $C_{14}$ paraffinic hydrocarbon and chlorinated paraffin wax.

3. A plastic composition according to claim 1, wherein the chlorinated polyvinyl chloride contains 62–65% by weight of chlorine.

4. A plastic composition according to claim 1, wherein the paraffinic hydrocarbon is substantially free from branched chain units.

5. A plastic composition according to claim 1, wherein the chlorinated hydrocarbon plasticizer is the sole plasticizer.

6. A plastic composition according to claim 2, wherein the proportion of chlorinated hydrocarbon plasticizer is not greater than 80 parts per 100 parts by weight of chlorinated polyvinyl chloride and polyvinyl chloride together.

7. A plastic composition according to claim 2, wherein the proportion of polyvinyl chloride is not greated than 200 parts per 100 parts of chlorinated polyvinyl chloride by weight and the proportion of chlorinated hydrocarbon plasticizer is 80–100 parts by weight per 100 parts of chlorinated polyvinyl chloride and polyvinyl chloride together by weight.

8. A filled plastic composition comprising a plastic composition according to claim 1 and a solid filler.

9. A filled plastic composition according to claim 8, wherein the proportion of filler is up to 800 parts per 100 parts by weight of plastic polymer in the composition.

10. A filled plastic composition according to claim 8, wherein the solid filler is a reinforcing filler.

References Cited by the Examiner
UNITED STATES PATENTS

| | | | |
|---|---|---|---|
| 1,982,765 | 12/34 | Schonburg | 260—92.8 |
| 2,198,970 | 4/40 | Muller | 260—33.8 |
| 2,230,000 | 1/41 | Hauffe et al. | 260—45.5 X |
| 2,421,408 | 6/47 | Brookman et al. | 260—28.5 |
| 2,513,632 | 7/50 | Fawcett et al. | 260—33.8 |
| 2,517,656 | 8/50 | Gislon | 260—33.8 |
| 2,636,869 | 4/53 | De Tartas | 260—45.4 X |

MORRIS LIEBMAN, *Primary Examiner.*

ALEXANDER H. BRODMERKEL, *Examiner.*